(12) United States Patent
Qa'Im-maqami

(10) Patent No.: US 7,747,940 B2
(45) Date of Patent: Jun. 29, 2010

(54) SYSTEM AND METHOD FOR DATA COLLECTION AND PROCESSING

(75) Inventor: Hood Qa'Im-maqami, Weehawken, NJ (US)

(73) Assignee: Barclays Capital Inc., New York, NY (US)

( * ) Notice: Subject to any disclaimer, the term of this patent is extended or adjusted under 35 U.S.C. 154(b) by 259 days.

(21) Appl. No.: 10/903,373

(22) Filed: Jul. 30, 2004

(65) Prior Publication Data

US 2006/0026500 A1 Feb. 2, 2006

(51) Int. Cl.
G06F 17/00 (2006.01)
G06F 17/30 (2006.01)
G06F 15/16 (2006.01)

(52) U.S. Cl. ............... 715/222; 715/226; 715/234; 715/255; 715/762; 705/10; 709/203

(58) Field of Classification Search ......... 715/500, 715/505, 506, 507, 508, 200–226, 234, 255, 715/256, 273, 700, 760, 762; 705/9, 10; 709/201–204, 212, 217, 219, 220, 225, FOR. 104, 709/FOR. 105, FOR. 106

See application file for complete search history.

(56) References Cited

U.S. PATENT DOCUMENTS

| | | | | |
|---|---|---|---|---|
| 5,704,029 | A * | 12/1997 | Wright, Jr. ............... | 715/223 |
| 5,893,098 | A * | 4/1999 | Peters et al. ............... | 707/10 |
| 6,026,433 | A | 2/2000 | D'Arlach et al. | |
| 6,088,700 | A * | 7/2000 | Larsen et al. ............... | 707/10 |
| 6,185,587 | B1 * | 2/2001 | Bernardo et al. ............ | 715/513 |
| 6,304,886 | B1 * | 10/2001 | Bernardo et al. ............ | 715/530 |
| 6,345,278 | B1 * | 2/2002 | Hitchcock et al. ........... | 707/100 |
| 6,434,532 | B2 * | 8/2002 | Goldband et al. ............ | 705/7 |
| 6,581,061 | B2 | 6/2003 | Graham | |
| 6,684,369 | B1 * | 1/2004 | Bernardo et al. ............ | 715/513 |
| 6,957,257 | B1 * | 10/2005 | Buffalo et al. ............. | 709/224 |
| 6,999,987 | B1 * | 2/2006 | Billingsley et al. .......... | 709/203 |
| 7,039,875 | B2 * | 5/2006 | Khalfay et al. ............. | 715/762 |
| 7,181,412 | B1 * | 2/2007 | Fulgoni et al. ............. | 709/203 |
| 2001/0029504 | A1 * | 10/2001 | O'Kane et al. ............. | 707/101 |
| 2001/0032115 | A1 * | 10/2001 | Goldstein ................ | 705/10 |

(Continued)

FOREIGN PATENT DOCUMENTS

WO    WO 0137170    *  5/2001

OTHER PUBLICATIONS

Summary of "Nortel Networks Clarify ClearHelpDesk: A comprehensive support system for enterprise help desks", Nortel Networks TM, pp. 1-4, 2001.*

(Continued)

*Primary Examiner*—Laurie Ries
*Assistant Examiner*—Maikhanh Nguyen
(74) *Attorney, Agent, or Firm*—Morgan Lewis & Bockius, LLP

(57) ABSTRACT

A system and method for data collection and processing. Creation of an electronic form by a form creator is facilitated. The electronic form includes a plurality of fields. A form user enters data into the fields of the electronic form, which is then submitted by the form user. The data is submitted to one or more back-end systems associated with the electronic form. The data is processed using the back-end system.

24 Claims, 6 Drawing Sheets

U.S. PATENT DOCUMENTS

| | | | |
|---|---|---|---|
| 2002/0007903 A1* | 1/2002 | Enlow et al. | 156/244.11 |
| 2003/0028792 A1* | 2/2003 | Plow et al. | 713/193 |
| 2003/0105659 A1* | 6/2003 | Eisenstein | 705/10 |
| 2003/0233316 A1* | 12/2003 | Hu et al. | 705/38 |
| 2004/0205533 A1 | 10/2004 | Lopata et al. | |
| 2004/0249786 A1* | 12/2004 | Dabney et al. | 707/1 |

OTHER PUBLICATIONS

Beachtech.com, "Eform: What is EForm", 1998, pp. 1-7.*

* cited by examiner

Click the submit button below to get Service A

Priority: Medium
How urgent is this?: Low
Region: Europe
Requestor:
End User:
Group: AIMS
Summary: A summary of the task or...
Category, Type, Item: Category:Applications
  Type: Service A [Modify]
  Item: Performance
Description: help me get Service A.

[Edit] [Submit] [Reset]

FIG. 4

Edit Form

Survey Service Web Form

Form Details

Form Name: [Survey Service Web Form]

| Component | User Prompt | Values | Format |
|---|---|---|---|
| Label | ○ Form Label  ◉ Section Label  ○ Description | [Section Heading] | [+][X] ◀▶ |
| Text Box | [What your thoughts on your salesperson?] | [Please something] [More] | [+][X] ◀▶ |
| Drop Down | [Sample select field] | Options (place one on each line):  Item 1  Item 2  Item 3 | [+][X] ◀▶ |

[More]

[User Guide]  [Reset] [Save]

FIG. 5

Survey Service Web Form

Section Heading

What your thoughts on your salesperson?

Please something

Sample select field

SYSTEM AND METHOD FOR DATA COLLECTION AND PROCESSING

BACKGROUND OF THE INVENTION

1. Field of the Invention

The present invention relates to development of electronic forms and processing of data collected using the electronic forms.

2. Background of the Invention

Non-technical personnel within an organization frequently have need to create forms that are accessible to others, within or external to the organization, over a network, such as a corporate intranet or the Internet. Typically, such non-technical personnel do not possess the skills that would allow them to create the forms themselves. Instead, such personnel are required to develop business specifications for the forms and provide the specifications to a developer, who then creates the electronic form (in HTML or other appropriate language). In addition, once the electronic form is created and made available to form users, data collected using the form must be made available for input into various back-end applications for processing. Again, developers are required to build interfaces for inputting data collected using the forms into the back-end systems. Use of developers for these purposes is costly and inefficient, particularly in a large organization. Thus, there exists a need for a self-service system that can be used by non-technical personnel to create electronic forms and automatically feed the data generated through completion of those forms into various applications for processing.

SUMMARY OF THE INVENTION

The present invention is directed to a system and method for data collection and processing. The invention facilitates creation of an electronic form by a form creator. The electronic form includes a plurality of fields. A form user enters at least one item of data into at least one of the fields of the electronic form. The form is submitted by the form user. The data is received and submitted to one or more back-end systems associated with the electronic form. The data is processed using the back-end system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings:

FIG. 2 is an exemplary screen shot used by a form creator to build a form using the present invention;

FIG. 3 is an exemplary screen shot of a form created by the form creator and completed by a form user;

FIG. 4 is an exemplary screen shot used by a form creator to build a form using the present invention;

FIG. 5 is an exemplary screen shot of a form created by the form creator and completed by a form user.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The form building application of the present invention allows non-technical users to create electronic forms which are posted on a network and made available to form users. Upon completion by a form user, the forms are used to submit information to a back-end API (in the examples described herein with reference to FIGS. 2, 3, 4, and 5, either tickets to the workflow system for processing IT Forms or a survey to the Survey Service API). A configuration file which defines a form is created. The form is defined by (i.e., made up of) many different components. When a form is built, the configuration file is used to generate the HTML that will display to end users. The inventive form building application allows the non-technical form creator to add, remove, edit and move the components up and down the page. The edit form (i.e., the form used by the form creator to create a form) understands rules that restrict the minimum and maximum number of components of each component type that may be displayed on a form. These rules ensure that any form created will be accepted by the back-end API.

Figure 1:
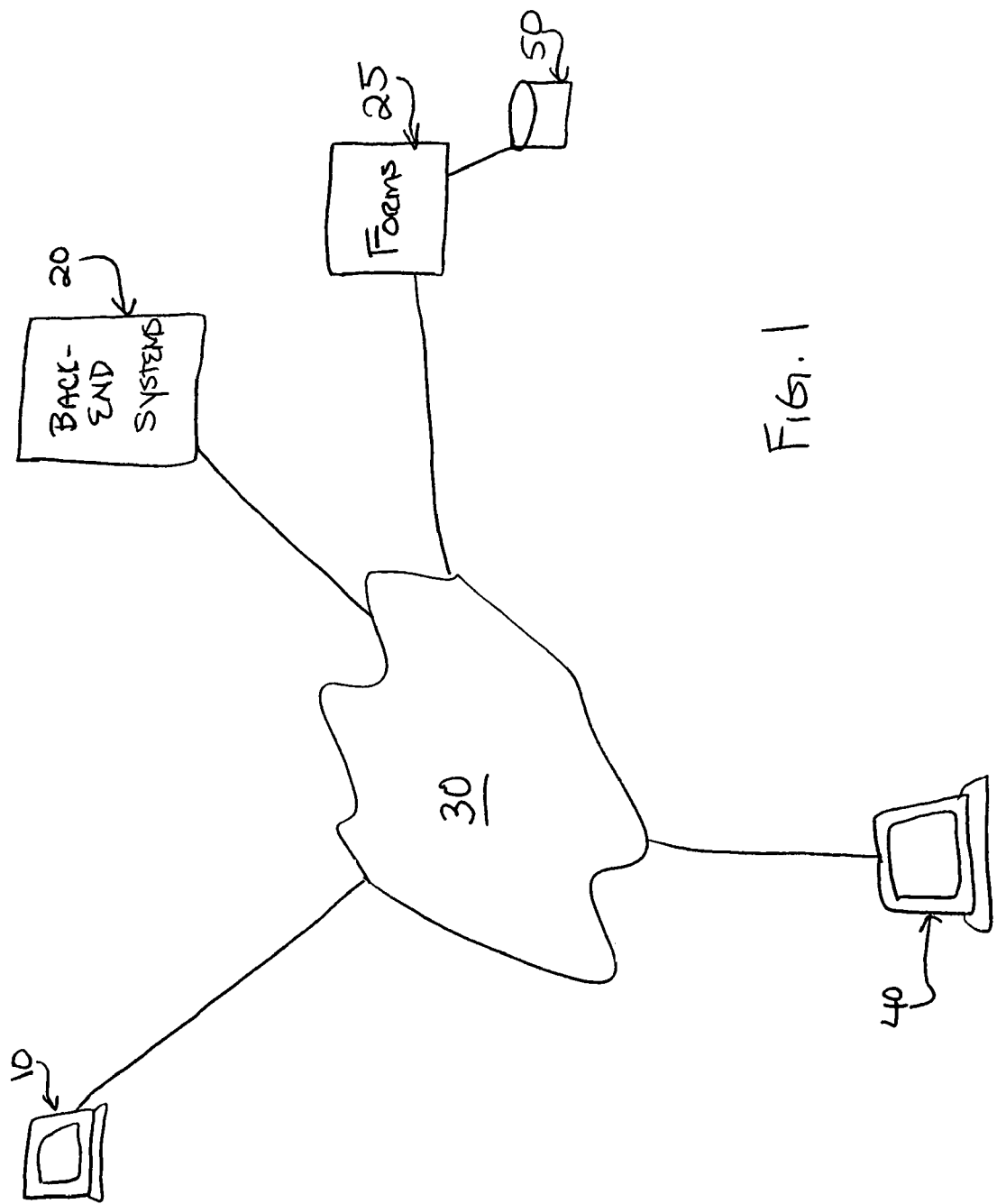
FIG. 1 illustrates an exemplary system for carrying out the present invention.

FIG. 1 illustrates an exemplary system for carrying out the present invention. Form creator(s) 10 can access server(s) 25, over a network 30, which may be, e.g., an intranet or the Internet. Server(s) 25 maintain the software used for creating the forms, and store the forms for subsequent serving to a form user 40. Data associated with the electronic forms may be maintained in a repository 50. Back-end applications that process the data collected using the forms may be maintained on servers(s) 20.

The following describes two exemplary processes for allowing non-technical users to create electronic forms. The first example describes a process for creating a form used to request technical assistance directed to an organization's information technology department. Upon completion of this type of form, the data generated thereby is automatically transported to a back-end system which generates a "ticket" for the request and routes the request to the organization's information technology department for handling. The second example describes a process for creating an electronic survey. Upon completing the survey, the data generated thereby is automatically transported to a back-end system where various analyses can be performed on the data. As will be known to those skilled in the art, the present invention can be used in connection with building other types of electronic forms and transporting the data generated thereby into various other back-end systems, in addition to those described herein. For example, a library of electronic forms may be maintained, each form having a plurality of components that are configurable by the form creator. Upon completion of such forms by the form user, various back-end processes may be launched to process the data generated by completion of the form.

The first example, the IT Service, is described with reference to FIGS. 2 and 3. In connection with the IT Service, a form creator can create a form (referred to herein as an "IT Form"), which, upon completion by a form user, results in the creation of a ticket, indicating a problem to be addressed by information technology personnel in an organization. The form creator begins the process by selecting the appropriate edit form for the IT Form from a library of forms. The edit form defines which information will be presented on the IT Form and which fields will require completion by the form user.

Each back-end system requires certain data for processing; in this example, the back-end system that processes the IT Form requires 15 items of data. Thus, the IT Form must deliver to the back-end system the required 15 items. However, not all 15 items need be completed by the form user. Instead, the form creator may elect to have the form user complete only certain of the fields of the IT Form. Other data fields may be auto-filled. It should be noted that, in some cases, the form creator may elect to have all data fields are auto-filled, thereby requiring the form user only to indicate his completion of the form, e.g., by hitting the "submit" button presented in connection with the electronic form. Thus, the form creator may chose to expose all of the questions to the form user, some of the questions to the form user or none of the questions to the form user. In the latter two instances, some or all of the fields are either pre-filled by the form creator or auto-filled with information regarding the user.

Figure 2:
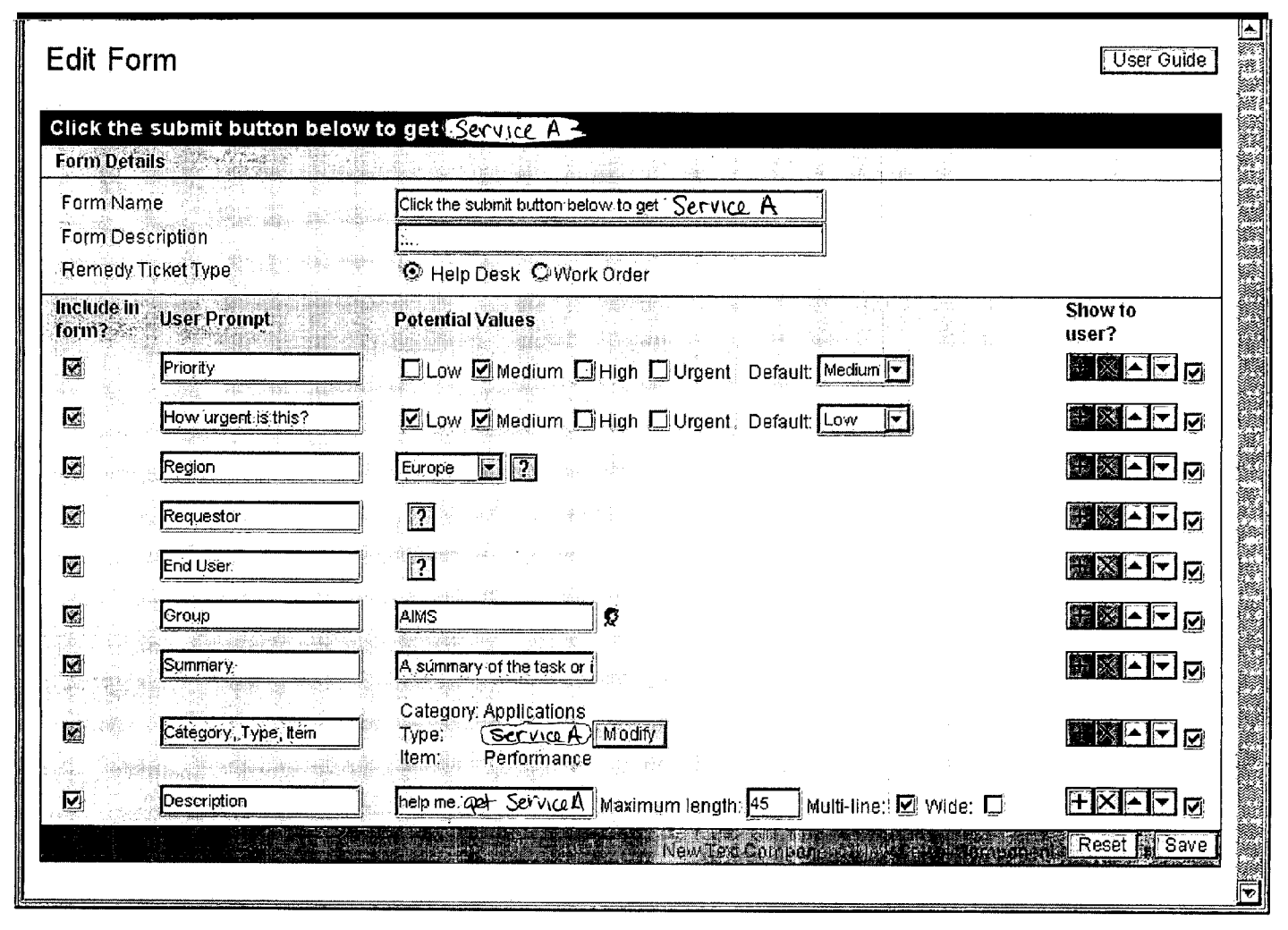

Returning again to the IT Form creation example, FIG. 2 provides an exemplary screen that may be used by the form creator to create the IT Form. The editable form selected by the form creator contains a number of components. Common attributes of components are described as follows. Each component on the IT Form has some common check boxes and buttons (e.g., check box—include in form, plus sign—add component, cross sign—delete component, arrow up—move component up, arrow down—move component down, check box—show to user). These are grayed out if the check box or action is not applicable to the particular component being addressed by the form creator.

If the form creator checks the include-in-form check box, the component will be made part of the IT Form. If the box is grayed out, the component is mandatory. This means that it must be shown on all IT Forms in order to create valid tickets. If the form creator clicks on the plus sign, a new component of the same type will be created underneath the current component. If the add component button is grayed out, a new component of this type cannot be created (e.g., because only one component of this type can be placed on an IT Form). Clicking on the cross sign will delete the component. If the delete component button is grayed out, the component is mandatory. This means that it must be shown on all IT Forms to create valid tickets. Clicking on the arrow up will move the component one place up on the form. Clicking on the arrow down will move the component one place down the form. In this example, the completed IT Form is laid out in the same order as displayed on the editable form.

Checking the show-to-user check box will ensure that the component is shown to the form user filling in the IT Form. If the checkbox is unselected, the information given about the component will not be shown on the IT Form and will be automatically included on every ticket created using the form. If the component is shown to the form user, the information given about the component will become the default values shown on the IT Form and the form user filling in the IT Form will be able to modify the values.

At the top of the editable form is a section dedicated to the details of the IT Form, for example the form name (i.e., the name of the form being created, appearing as a title on the IT Form); form description (i.e., text appearing in connection with the IT Form, e.g., providing instructions on how to fill in the IT Form); and ticket type (e.g., a help desk ticket and a change request ticket).

The priority and urgency components set the importance level on a ticket. Both components can be set to low, medium, high and urgent. To set the values for all tickets created with the particular form being created, the form creator would untick the show-to-user check box. To allow the form user to set the priority and urgency components, the form creator would tick the show-to-user check box.

The region component sets the region to which the ticket will be sent. The selection changes the server at which the ticket will originally arrive. The assigned group is the IT group to which the ticket is to be sent. A group is mandatory for all tickets. The form user may select a group for an IT Form. Alternatively, if the group component is set to be shown to form users, the form user filling in the IT Form will need to select a group himself before the ticket is to be accepted.

The requester is the person who is requesting service. The form creator would untick the show-to-user check box for the request component to automatically select the person who is completing the IT Form. The form creator would tick the show-to-user check box to allow the person completing the IT Form to select a requestor. The end user is the person for whom a service will ultimately be carried out. The form creator would untick the show-to-user check box for the end user component to automatically select the person who is selected as the end user and would tick the show-to-user check box to allow the person completing the IT Form to select an end user.

The summary component of an IT Form acts similarly to the subject of an e-mail. Users see the summaries in lists of tickets.

A category, type, and item selection needs to be made for each ticket, which is used to classify the ticket. The value of these can be set by the form creator or by the form user when he fills out the IT Form. To change the values, the modify button is clicked and the user selects the category, type and item when prompted. Once selected, the values appear to the left of the modify button. If the category, type and item components are set to be shown to all form users, the form user filling in the IT Form will need to select a category, type and item himself for the ticket to be accepted.

FIG. 3 provides an example of an IT Form created by a form creator and presented to a form user.

The second example, the Survey Service, is described with reference to FIGS. 4 and 5. The Survey Service allows a form creator to create a Survey to be completed by a form user; the form creator can then save and retrieve the results using an interface referred to herein as a Survey Results Form. The Survey Service can also be used to provide others access to the Survey results.

Preliminarily, the form creator must select a name for the Survey; the appropriate width of the box that will appear to the form user in taking the Survey; whether the Survey will appear on an existing page of the network, or a new page; and the layout for the Survey. Then, the form creator will be presented with various screens, showing various components that will be required to create the Survey. An exemplary screen used by the form creator is shown in FIG. 4. The form is divided into form name and form components. A form name must be provided. Three form components are shown by default, namely, section label, text box and drop down. These can be deleted from the survey by the form creator clicking the X symbol under the format column. A reset button appears on both the editable form and the actual Survey. This allows any changes made in the interim on the editable form or Survey to be reset back to the original.

As shown in FIG. 4, the form builder has four different properties/columns. The component column informs the form creator which components have been placed on to the Survey. If the form creator hovers his mouse over the component name, a tool tip will appear describing the component in more detail. The user prompt column represents a question on the form. For all components that have a user prompt field, the form user is required to type in a question. The form user taking the Survey will input his/her answer depending on the form component specified by the form creator in the values column. Using the options presented in the format column, the form creator can either add or remove form components. Clicking the up and down buttons moves the form component up or down on the form.

Form components are found by clicking the add button under the format column. The various components that can be added are explained as follows. The checkbox component adds a text field to the form with a box which can be checked by the user (e.g., "Please check if you are a London-based user."). The date picker component adds a text field to the form and enables the forms creator to ask a question in response to which a date can be specified. The people picker component adds a text field to the form and enables the form creator to ask a question in response to which a person's name can be specified. The spacer component adds a small space or a large space between question on the survey. It is usually used to help break a form into sections. The employee details component is a component not shown to form users but, if included in the Survey by the form creator, will provide a way of retrieving various employee-specific details about the form user (if an employee) responding to the survey (such as, region, full name, department, title, division etc.). The client details component is a component that is also not shown to form users but, if included in the Survey by the form creator, will provide a way of retrieving client-specific details about the form user (if a client) responding to the survey (such as region, email address, full name, firm name, account manager etc.). The asset picker component allows for querying of a database using a simple pop-up window lookup feature. The label component allows the Survey to be divided up into different sections using three section headers (i.e., form label, section label or by description). The drop down component adds a drop down box to the Survey, allowing the user to select from a number of options. The form creator may set the drop down box with a default answer, which can then be changed by the form user to the most appropriate option. The form creator may also require, in connection with the drop down box, that the form user choose and option before he can submit the Survey. A text box component may be included in the Survey, allowing the form user to type arbitrary text. The text box can be limited by a maximum number of characters; can be made compulsory; and can be configured to be of a certain size and/or allow words to be set out on more than one line.

Once the Survey Service form has been completed, the form creator can save the form by clicking on the save button on the bottom right-hand corner of the screen shown in FIG. 4. In addition, a reset button (which appears both on the form and on the Survey) allows any changes made on the form or the Survey to be reset back to the original.

Additional administration screens allow the survey form creators to choose the option of restricting whether a user can respond to a survey more than once. The form creators can also specify what sort of confirmation will be displayed when a user responds to their survey, including email confirmation. Form users can modify a previously submitted survey if the form creator has allowed this. In this case, when a form is requested, the configuration file is used to generate the HTML that is displayed and pre-populated with the answers from the central repository.

An exemplary Survey, created by a form creator and presented to a form user, is illustrated in FIG. 5.

Form users may then complete the forms (e.g., the IT Form or the Survey), created by the form creators. In the preferred embodiment, upon the form user hitting the "submit" button, or otherwise indicating his completion of the form, the back-end system is automatically triggered, and the data contained in the form (either input by the form user or automatically included in the form) is automatically transported to the back-end system. In particular, each field in the form maps to an API call to the given back-end system.

Figure 6:
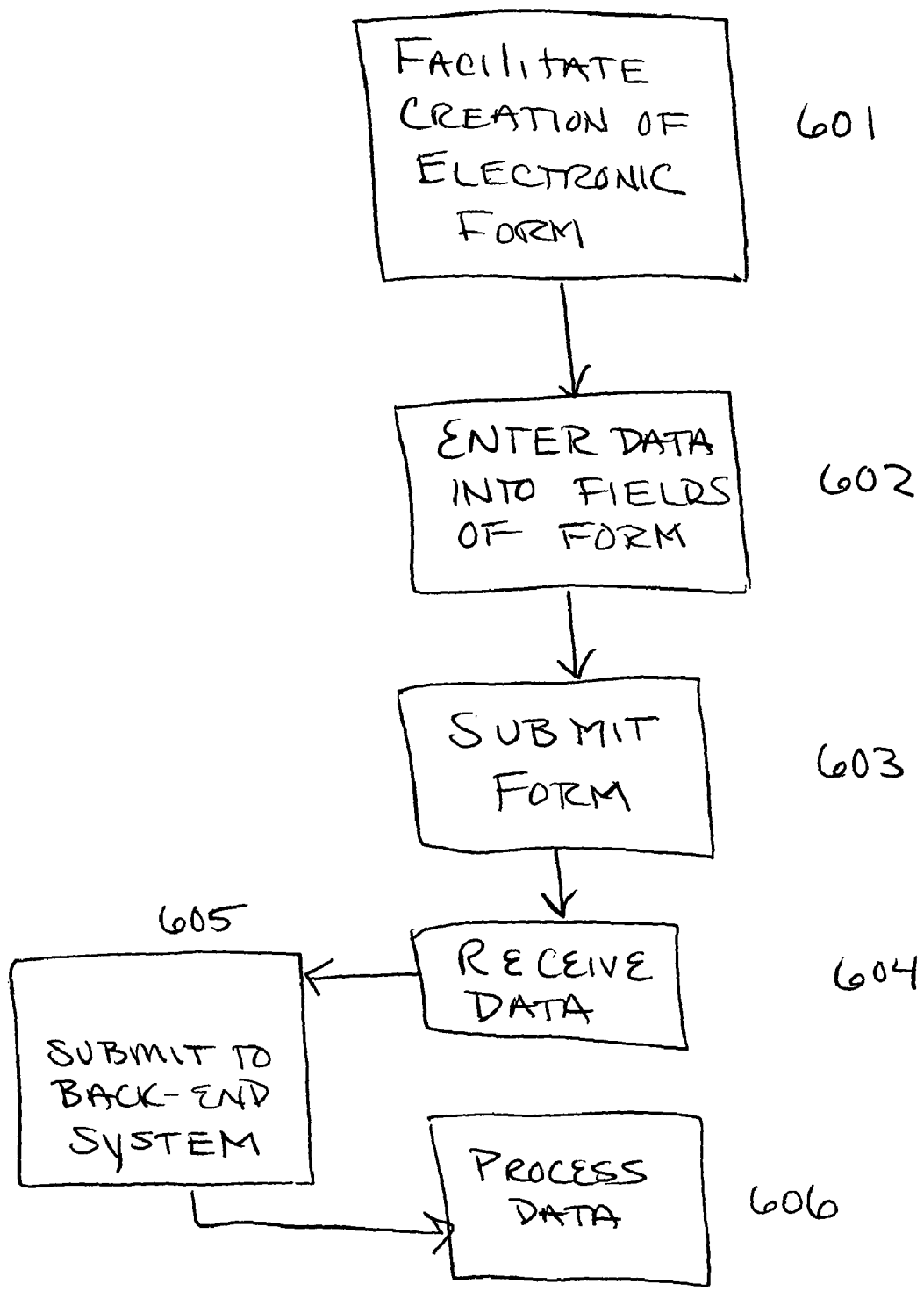
FIG. 6 is a flow chart illustrating a preferred embodiment of a method of the present invention.

FIG. 6 is a flow chart illustrating a preferred embodiment of a method of the present invention for data collection and processing. Creation of an electronic form by a form creator is facilitated in step 601. The electronic form includes a plurality of fields. In step 602, a form user enters at least one item of data into at least one field of the electronic form. In step 603, the form is submitted by the form user. In step 604, the data is received. In step 605, the data is submitted to one or more back-end systems associated with the electronic form. The data is processed using the back-end system in step 606.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for data collection and processing, comprising:

creating a plurality of different electronic forms automatically, using an electronic form template defining one or more rules, from selections provided by one or more of form creators, each of the electronic forms including one or more fillable fields and one or more statements or questions to be presented to one or more form users, wherein the one or more form creators creates the statements or questions;

disseminating at least some of the plurality of different electronic forms to one or more of the one or more form users via a computer network;

receiving data entered into at least one fillable field on the at least some of the plurality of different electronic forms; and submitting the data received from the at least some of the plurality of different electronic forms to one or more back-end systems associated with the at least some of the plurality of different electronic forms for processing the received data using the one or more back-end systems, wherein each of the one or more fillable fields maps to one or more application programming interface calls to the one or more back-end systems in accordance with the one or more rules, wherein the step of creating the plurality of different electronic forms includes:

presenting to the one or more form creators a plurality of form-building inquiries, receiving from the one or more form creators one or more responses to the plurality of form-building inquiries, and automatically generating the plurality of different electronic forms based on the one or more responses.

2. The method of claim 1, wherein one or more of the data are entered into the fillable fields of the at least some of the plurality of different electronic forms automatically.

3. The method of claim 2, wherein the one or more of the data are entered into the fillable fields of the at least some of the plurality of different electronic forms automatically based on an identity of the one or more form users.

4. The method of claim 1, wherein one or more of the data are entered into the fillable fields of the at least some of the plurality of different electronic forms by the one or more form users.

5. The method of claim 1, wherein the plurality of different electronic forms are technical assistance request forms.

6. The method of claim 5, wherein a ticket is generated for a request entered into one of the technical assistance request forms.

7. The method of claim 1, wherein the plurality of different electronic forms are surveys.

8. The method of claim 1, wherein each of the plurality of different electronic forms comprises one or more components, each component comprising a component type, and wherein the rules indicate at least one of a minimum and maximum number of each of the component types on each of the plurality of different electronic forms.

9. A system for data collection and processing, comprising:
at least one processor;
a computer-readable storage medium;
a form creation module, stored in the computer-readable storage medium, for automatically creating a plurality of different electronic forms, using an electronic form template defining one or more rules, from selections provided by one or more form creators, each of the electronic forms including one or more fillable fields and one or more statements or questions to be presented to one or more form users, wherein the one or more form creators creates the statements or questions, at least some of the plurality of different electronic forms are disseminated to one or more of the one or more form users via a computer network;
a repository for maintaining the at least some of the plurality of different electronic forms and for maintaining data entered into at least one fillable field on the at least some of the plurality of different electronic forms; and
one or more back-end systems, associated with the at least some of the plurality of different electronic forms, for receiving the data from the electronic form and for processing the received data wherein each of the one or more fillable fields maps to one or more application programming interface calls to the one or more back-end systems in accordance with the one or more rules,
wherein the step of creating the plurality of different electronic forms includes:
presenting to the one or more form creators a plurality of form-building inquiries,
receiving from the one or more form creators one or more responses to the plurality of form-building inquiries, and
automatically generating the plurality of different electronic forms based on the one or more responses.

10. The system of claim 9, wherein one or more of the data are entered into the fillable fields of the at least some of the plurality of different electronic forms automatically.

11. The system of claim 10, wherein the one or more of the data are entered into the fillable fields of the at least some of the plurality of different electronic forms automatically based on an identity of the one or more form users.

12. The system of claim 9, wherein one or more of the data entered into the fillable fields of the at least some of the plurality of different electronic forms by the one or more form users.

13. The system of claim 9, wherein the plurality of different electronic forms are technical assistance request forms.

14. The system of claim 13, wherein the back-end system generates a ticket for a request entered into one of the technical assistance request forms.

15. The system of claim 9, wherein the plurality of different electronic forms are surveys.

16. The system of claim 9, wherein each of the plurality of different electronic forms comprises one or more components, each component comprising a component type, and wherein the rules indicate at least one of a minimum and maximum number of each of the component types on each of the plurality of different electronic forms.

17. A computer program product including a computer readable storage medium having stored thereon computer executable code that, when executed on a computer, implements a process comprising:
creating a plurality of different electronic forms automatically, using an electronic form template defining one or more rules, from selections provided by one or more of form creators, each of the electronic forms including one or more fillable fields and one or more statements or questions to be presented to one or more form users, wherein the one or more form creators creates the statements or questions;
disseminating at least some of the plurality of different electronic forms to one or more of the one or more form users via a computer network;
receiving data entered into at least one fillable field on the at least some of the plurality of different electronic forms; and
submitting the data received from the at least some of the plurality of different electronic forms to one or more back-end systems associated with the at least some of the plurality of different electronic forms for processing the received data using the one or more back-end systems wherein each of the one or more fillable fields maps to one or more application programming interface calls to the one or more back-end systems in accordance with the one or more rules,
wherein the step of creating the plurality of different electronic forms includes:
presenting to the one or more form creators a plurality of form-building inquiries,
receiving from the one or more form creators one or more responses to the plurality of form-building inquiries, and
automatically generating the plurality of different electronic forms based on the one or more responses.

18. The computer program product of claim 17, wherein one or more of the data are entered into the fillable fields of the at least some of the plurality of different electronic forms automatically.

19. The computer program product of claim 18, wherein the one or more of the data are entered into the fillable fields of the at least some of the plurality of different electronic forms automatically based on an identity of the one or more form users.

20. The computer program product of claim 17, wherein one or more of the data are entered into the fillable fields of the at least some of the plurality of different electronic forms by the one or more form users.

21. The computer program product of claim 17, wherein the plurality of different electronic forms are technical assistance request forms.

22. The computer program product of claim 21, wherein a ticket is generated for a request entered into one of the technical assistance request forms.

23. The computer program product of claim 17, wherein the plurality of different electronic forms are surveys.

24. The computer program product of claim 17, wherein each of the plurality of different electronic forms comprises one or more components, each component comprising a component type, and wherein the rules indicate at least one of a minimum and maximum number of each of the component types on each of the plurality of different electronic forms.

* * * * *